United States Patent
Cai et al.

(10) Patent No.: US 8,687,528 B2
(45) Date of Patent: Apr. 1, 2014

(54) LAYER 2 RELAY MULTIPLEXING AND INTERFERENCE MITIGATION

(75) Inventors: Zhijun Cai, Irving, TX (US); James E. Womack, Irving, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1016 days.

(21) Appl. No.: 12/610,950

(22) Filed: Nov. 2, 2009

(65) Prior Publication Data

US 2010/0110942 A1 May 6, 2010

Related U.S. Application Data

(60) Provisional application No. 61/110,456, filed on Oct. 31, 2008.

(51) Int. Cl.
*H04B 7/14* (2006.01)

(52) U.S. Cl.
USPC ......................................................... 370/279

(58) Field of Classification Search
USPC ......................................................... 370/279
See application file for complete search history.

(56) References Cited

U.S. PATENT DOCUMENTS

| | | | |
|---|---|---|---|
| 2007/0019667 A1* | 1/2007 | Mottier et al. ................. | 370/458 |
| 2007/0177545 A1* | 8/2007 | Natarajan et al. ............. | 370/331 |
| 2008/0081626 A1* | 4/2008 | Choi et al. ..................... | 455/442 |
| 2008/0219229 A1* | 9/2008 | Zheng ............................ | 370/338 |
| 2011/0177823 A1* | 7/2011 | Miao et al. .................... | 455/450 |

FOREIGN PATENT DOCUMENTS

| | | |
|---|---|---|
| CN | 1996786 A | 7/2007 |
| DE | 102004039674 A1 | 11/2005 |
| EP | 1804430 A1 | 7/2007 |
| EP | 1912450 A2 | 7/2007 |
| EP | 1890402 A2 | 8/2007 |
| EP | 1890510 A2 | 2/2008 |
| EP | 1931155 A1 | 6/2008 |
| JP | 0529956 A | 10/1993 |
| JP | 2000031877 A | 1/2000 |
| JP | 2006246002 A | 9/2006 |
| JP | 2007184936 A | 7/2007 |
| JP | 2008048236 A | 2/2008 |
| WO | 2008044318 A1 | 4/2008 |

OTHER PUBLICATIONS

PCT International Search Report; PCT Application No. PCT/US2009/062990; Jun. 23, 2010; 6 pgs.
PCT Written Opinion of the International Searching Authority; PCT Application No. PCT/US2009/062990; Jun. 23, 2010, 10 pgs.

(Continued)

*Primary Examiner* — Huy D Vu
*Assistant Examiner* — Adnan Baig
(74) *Attorney, Agent, or Firm* — Conley Rose, P.C.; J. Robert Brown, Jr.

(57) ABSTRACT

A network arrangement comprising a relay node (RN), wherein the RN is configured to assign a plurality of resource blocks (RBs) allocated by an enhanced node B (ENB) for at least one user equipment (UE). A network comprising an ENB, wherein the ENB is configured to allocate a plurality of RBs for an RN, wherein the RBs are assigned for at least one UE. Also disclosed is a method for communicating in a network, comprising selecting a time-division (TD) communication mode, and using resource scheduling based on the selected TD communication mode.

25 Claims, 12 Drawing Sheets

(56) References Cited

OTHER PUBLICATIONS

Mexican Office Action; Application No. MX/a/2011/004579; Jul. 9, 2012; 11 pages.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
3GPP TS 23.401 v8.3.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Sep. 2008; 204 pgs.
3GPP TS 23.203 v7.8.0; 3rd Generation Partnership Project; Technical Specification Group Services and System Aspects; Policy and Charging Control Architecture; Release 7; Sep. 2008; 74 pgs.
3GPP TS 36.300 v8.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2008; 137 pgs.
Texas Instruments; 3GPP TSG RAN WG1 #54bis; Title: Decode and Forward Relays for E-UTRA Enhancements; R1-083533; Prague, Czech Republic; Sep. 29-Oct. 3, 2008; 5 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Ericsson; TSG-RAN WG1 #53; Title: A Discussion on Some Technology Components for LTE-Advanced; R1-082024; Kansas City, MO, USA; May 5-9, 2008; 11 pgs.
China Mobile, et al.; TSG-RAN WG1 #54; Title: Application Scenarios for LTE-Advanced Relay; R1-082975; Jeju, Korea; Aug. 18-22, 2008; 7 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Motorola; TSG-RAN WG1 #54; Title: Classification of Relays; R1-083223; Jeju, South Korea; Aug. 18-22, 2008; 3 pgs.
Mitsubishi Electric; 3GPP TSG RAN WG1 #54 Meeting; Title: Basic Structure of Relaying Under Multi-Antenna eNB; R1-082775; Jeju Island, Korea; Aug. 18-22, 2008; 4 pgs.
Doppler, Klaus, et al.; Assessment of Relay Based Deployment Concepts and Detailed Description of Multi-hop Capable RAN Protocols as Input for the Concept Group Work; IST-4-027756 WINNER II D3.5.2 v1.0; Information Society Technologies; Jun. 30, 2007; 24 pgs.
3GPP TSG RAN WG1 Meeting #54; Discussion on the Various Types of Relays; Panasonic; R1-082397; Jun. 30-Jul. 4, 2008; 6 pgs.
TSG-RAN WG1 #53, A Discussion on Some Technology Components for LTE-Advanced; Ericsson; R1-082024; May 5-9, 2008; 11 pgs.
PCT Communication Relating to the Results of the Partial International Search; PCT Application No. PCT/US2009/062990; Mar. 2, 2010; 8 pgs.
Korean Office Action; Application No. 10-2011-7012505; Oct. 17, 2012; 15 pages.
Australian Office Action; Application No. 2009308663; Feb. 21, 2013; 4 pages.
Japanese Office Action; Application No. 2011-534859; Feb. 26, 2013; 12 pages.
Canadian Office Action; Application No. 2,742,287; Apr. 15, 2013; 3 pages.
Mexican Office Action; Application No. MX/a/2011/004579; Apr. 22, 2013; 6 pages.
Doppler, Klaus, et al.; "Assessment of Relay Based Deployment Concepts and Detailed Description of Multi-hop Capable RAN Protocols as Input for the Concept Group Work"; IST-4-027756; D3.5.2 V1.0; Jun. 30, 2007; 102 pages.
3GPP TSG RAN WG1 Meeting #54; "Discussion on the Various Types of Relays"; R1-082397; Warsaw, Poland; Jun. 30-Jul. 4, 2008; 6 pages.
Chinese Office Action; Application No. 200980152985.7; Jun. 14, 2013; 26 pages.
European Extended Search Report; Application No. 12151171; May 2, 2013; 8 pages.
3GPP TSG-RAN WG1 #54bis; "Operation of Relays in LTE-A"; R1-083810; Prague, Czech Republic; Sep. 29-Oct. 3, 2008; 6 pages.
3GPP RAN WG1 #54bis; "Support of Rel-8 UEs by LTE-A Relays"; R1-084054; Prague, Czech Republic; Sep. 29-Oct. 3, 2008; 18 pages.
3GPP TSG RAN WG1 #55; "L2 Relay Interference Mitigation"; R1-084102; Prague, Czech Republic; Nov. 10-14, 2008; 6 pages.

* cited by examiner

LAYER 2 RELAY MULTIPLEXING AND INTERFERENCE MITIGATION

CROSS-REFERENCE TO RELATED APPLICATIONS

The present application claims priority to U.S. provisional patent application No. 61/110,456, filed Oct. 31, 2008, by Zhijun Cal, et al, entitled "Layer 2 Relay Multiplexing and Interference Mitigation", which is incorporated by reference herein as if reproduced in its entirety.

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network nodes. When a UE is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a SIP session.

In traditional wireless telecommunications systems, transmission equipment in a base station can communicate with the UEs by transmitting signals throughout a geographical region known as a cell. As technology has evolved, more advanced equipment has been introduced that can provide services that were not possible previously. This advanced equipment may include, for example, an enhanced node B (ENB) rather than a base station or other systems and devices that are more evolved than the equivalent equipment in a traditional wireless telecommunications system. Such advanced or next generation equipment may be referred to herein as long-term evolution (LTE) equipment.

For instance, the LTE equipment used in radio access networks (RANs) and based on an LTE-Advanced (LTE-A) standard for the Third Generation Partnership Project (3GPP) may include relay nodes (RNs) that communicate with the UEs within the same cells. As such, the RNs or otherwise promote communications or signals between the UEs and remote ENBs or other LTE or LTE-A based equipment to provide remote communications between the UEs and the ENBs at higher rates or lower transmitted signal powers. Such relay technologies have been included to improve the system throughput and cell edge coverage.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The RNs may relay the signals between the UEs and the ENBs using frequency-division duplexing (FDD), where signals are received and transmitted at different frequencies. As such, the RNs may receive and transmit signals at about the same time with reduced signal interference between the received and transmitted signals. However, transmitting and receiving the signals to the UEs and the ENBs at about the same time may be difficult due to technical challenges related to the transmitters, receivers, or transceivers at the RNs. Hence, the RNs may relay the signals to the UEs and the ENBs using time-division (TD), where the signals may be transmitted, received, or both at different transmission time intervals (TTIs).

Figure 1:
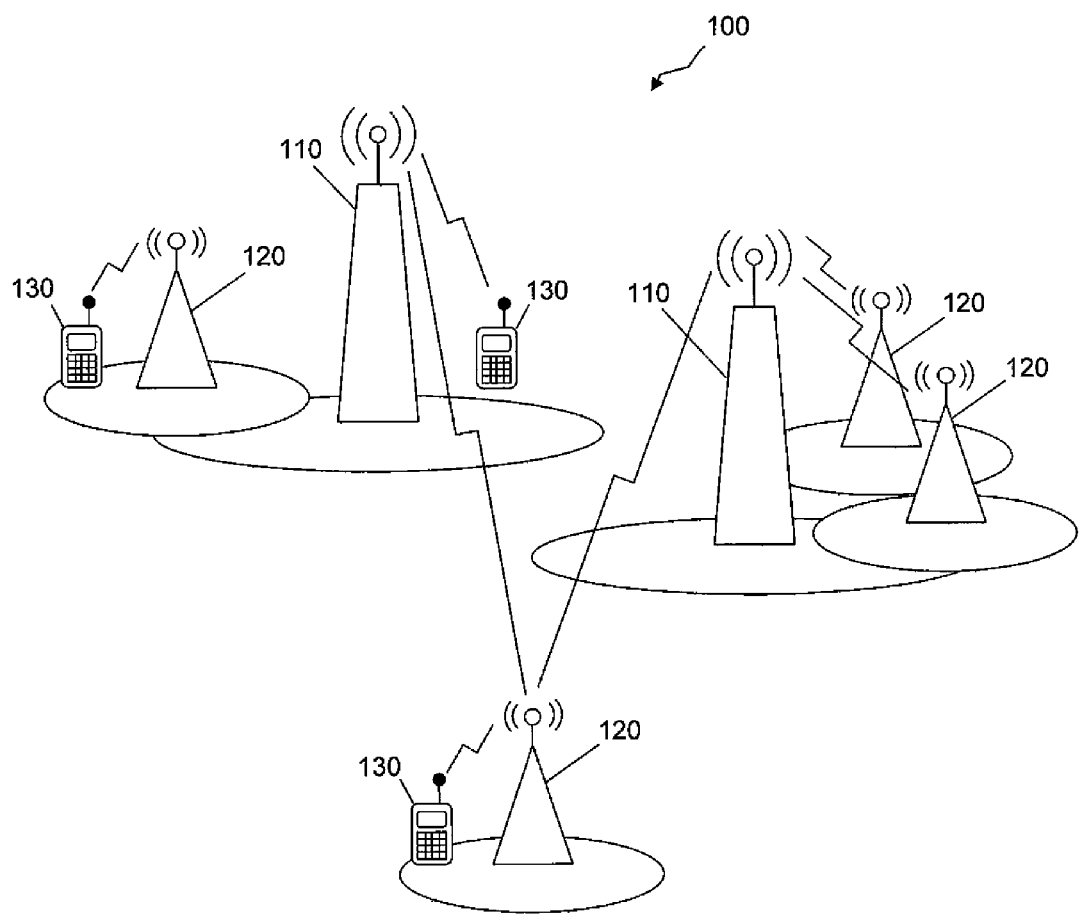
FIG. 1 is an illustration of a LTE-A system according to an embodiment of the disclosure.

Disclosed herein is a system and methods for transmitting and receiving signals at the RNs using TD. For instance, using a half-duplex TD mode, an RN may receive signals from a UE in the same cell via an access link and from an ENB via a relay link, at about a first TTI (or T1), and transmit the signals to the UE and ENB at about a second TTI (or T2) in an alternating manner. Alternatively, using a full-duplex TD mode, the UE's signals may be received and transmitted at about T1, while the ENB's signals may be received and transmitted at about T2. Additionally, full resource scheduling (FRS) at the ENB or partial resource scheduling (PRS) at the ENB and RN, which are described in more details below, may be used to reduce signal interference at the different components. For instance, at about T1 of the half-duplex mode, FRS may be used to schedule at the ENB all the downlink communications to the RNs and to the UEs communicating directly with ENB. Additionally, PRS may be used to schedule at the ENB the uplink communications from the RNs and the UEs communicating directly with ENB, and to schedule at the RNs the uplink communications from the UEs in the same cells with the RNs. Further, at about T2, FRS may be used to schedule at the ENB all the uplink communications from the RNs and from the UEs communicating directly with ENB. Additionally, PRS may be used to schedule at the ENB the downlink communications to the RNs and the UEs communicating directly with ENB, and to schedule at the RNs the downlink communications to the UEs in the same cells with the RNs. Alternatively, in the full-duplex mode, FRS may be used at about T1 for communication via relay links and PRS may be used at about T2 for communication via access links. Additionally, in some embodiments, the present disclosure provides for the ENB or access device to allocate, whether fixed or semi-statically, the Physical Downlink Shared Channel (PDSCH)/Physical Uplink Shared Channel (PUSCH) resources for the RNs to reduce interference that might be caused by the independent scheduling between the ENB and the RNs FIG. 1 illustrates an embodiment of a RAN 100, which may be an LTE-A system as described in the 3GPP. FIG. 1 is exemplary and may have other components or arrangements in other embodiments. In an embodiment, the RAN 100 may comprise at least one access device 110, at least one RN 120, and at least one UE 130. The access devices 110 may be an ENB, a base station, or other components that promote network access for the UEs 130. The access devices 110 may communicate with any UE 130, which may be within the same cell, directly via a direct link. For instance, the direct link may be a point-to-point link established between the access device 110 and the UE 130 and used to transmit and receive signals between the two. The access devices 110 may communicate with at least some of the RNs 120 via relay links or with other access devices 110. Additionally, the access devices 110 may communicate with other components or devices to provide for the components of the RAN 100 access to other networks, for instance using similar or different network protocols or technologies.

The RNs 120 may comprise at least one of three types of devices, Layer 1 (L1) relays, Layer 2 (L2) relays, and Layer 3 (L3) Relays. The L1 relays may be repeaters that receive and retransmit signals (without demodulation/decoding of the signals) between the UEs 130 and the access devices 110. The L2 relays may receive and transmit the signals, for instance using TD and/or FDD. The L2 relays may demodulate the received signals and modulate the signals before retransmission, for instance based on radio conditions, to improve transmission reliability. Additionally, the L2 relays may use resource scheduling for transmitting and receiving the signals from the UEs 130 or the access devices 110. The L3 relays may be mini-ENBs that are configured similar to the access devices 110 or comprise at least some of the functionalities of the access devices 110, such as radio resource management and resource scheduling.

The RNs 120 may communicate with any UE 130 within the same cell via access links and with the access devices 110 via relay links to establish indirect communications between the UEs 130 and the access devices 110. For instance, the access link may be a point-to-point link established to exchange signals between an RN 120 and a UE 130 and the relay link may be a point-to-point link established to exchange signals between the RN 120 and the access device 110. Further, the UEs 130 may be moved due to handover between the cells corresponding to different access devices 110 or RNs 120. Hence, the UEs 130 may establish communications with the access devices 110 via direct links or with different RNs 120 via access links. Further, the UEs 130 may communicate with one another using the direct links established with the access device 110 or using the access links established with the RNs 120 and the relay links between the RNs 120 and the access devices 110.

Figure 2:
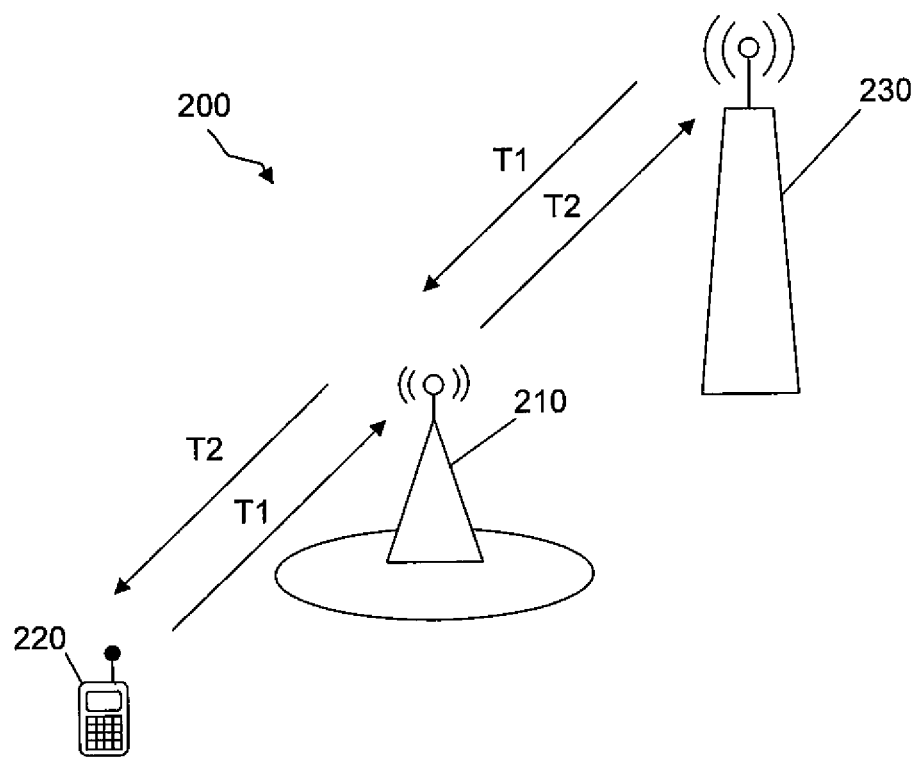
FIG. 2 is an illustration of a communication mode according to an embodiment of the disclosure.

FIG. 2 illustrates an embodiment of a communication mode, which may be used in a RAN 200. The RAN 200 may comprise an RN 210, at least one UE 220 in the same cell with the RN 210, and an ENB 230, which may be similar to the corresponding components of the RAN 100 described above. The communication mode describes how the RN 210 transmits and/or receives signals via an access link with the UE 220 and a relay link with the ENB 230, for instance using FDD. Since it may be technically challenging to obtain an RN 210 that transmits and receives signals simultaneously using the same frequency, the RN 210 may be configured to transmit and receive the signals using TD.

Specifically, the communication mode may be a half-duplex TD mode, where the RN 210 may transmit and receive the signals at different TTIs, for instance a first TTI (T1) and a second TTI (T2), where T1 and T2 are alternating time intervals. The alternating TTIs may be set about equal or may not be equal, based on the traffic load, radio conditions, etc. in an embodiment, the RN 210 may receive the signals from the UE 220 via the access link and the signals from the ENB 230 via the relay link at about T1. The RN 210 may then transmit the signals to the UE 220 and the ENB 230 at about T2. Accordingly, the RN 210 may comprise two transmitters and two receivers, or two transceivers, to operate in the half-duplex TD mode. In some embodiments, a "guard" time between T1 and T2 may be used to add time pauses and ensure no overlap between signal transmission and reception at T1 and T2, which may occur due to signal travel time or system introduced delays, such as processing, timing, or other delays.

In an embodiment, the RN 210 may be an L2 relay or L3 relay, which may schedule the transmissions via the access links with the UE 220 and any other UEs 220 within the same cell, for instance by assigning resource blocks (RBs), time slots, etc. Further, all the UEs 220 within the same cell may transmit the signals to the RN 210 at about T1, and receive the signals from the RN 210 at about T2, via their corresponding access links.

Figure 3:
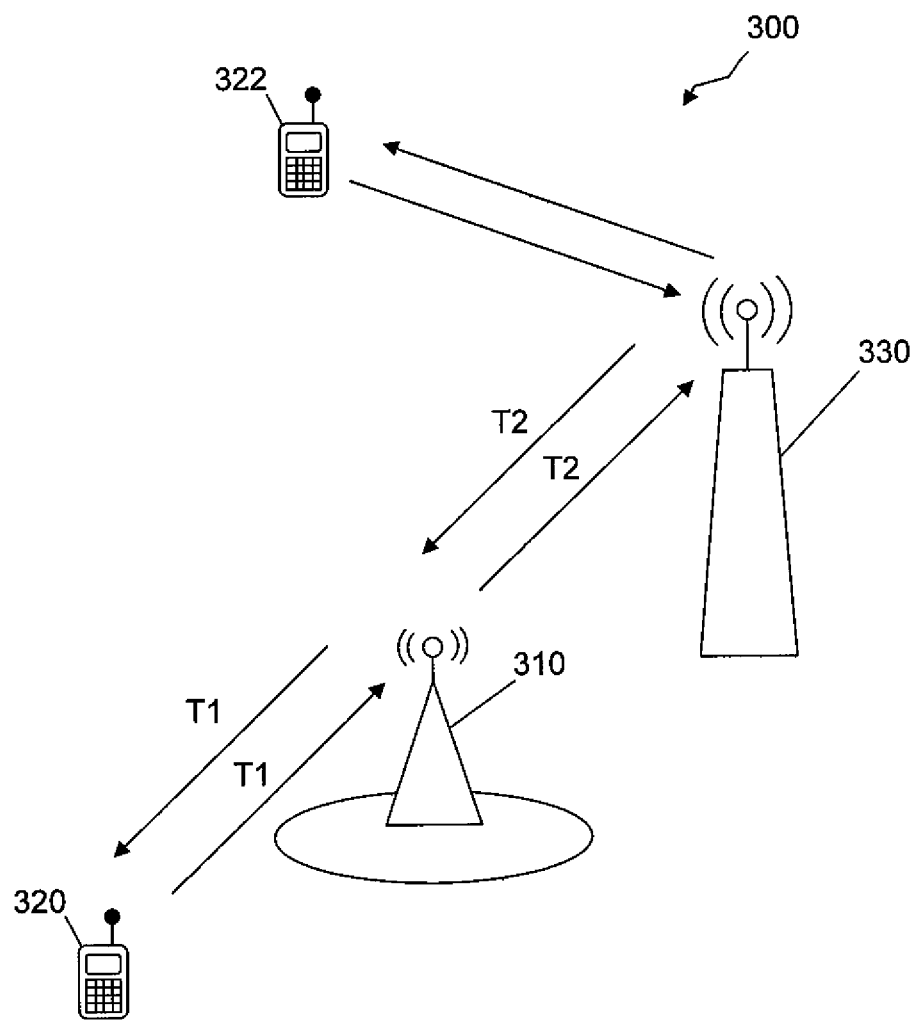
FIG. 3 is an illustration of another communication mode according to an embodiment of the disclosure.

FIG. 3 illustrates another embodiment of a communication mode which may be used in a RAN 300. Similar to the RAN 200, the RAN 300 may comprise an RN 310, at least one UE 320 in the same cell with the RN 310, and an ENB 330. The communication mode may be a full-duplex TD mode, where the RN 210 may transmit and receive the UE's 320 signals via the access link at about T1, and the ENB's 330 signals via the relay link at about T2, where T1 and T2 are alternating TTIs. A "guard" time between T1 and T2 may also be used to compensate for system or other delays. Accordingly, the RN 210 may comprise one transmitter and one receiver, or one transceiver, to operate in the full-duplex TD mode. Similar to the RN 210, the RN 310 may be an L2 relay or L3 relay, which may assign RBs to communicate with different UEs 320 via their access links at about T1. In some embodiments, the RAN 300 may also comprise a UE 322, which may be located outside the donor cell (covered by the RNs) including the RN 310 and the UE 320 and may communicate directly with the ENB 230 via a direct link.

In the case of multiple RNs within the same cell of the ENB 230, each RN may have its own T1/T2 allocation pattern (e.g., different T1/T2 duration, recurring pattern, etc). But to simplify the system and to reduce the potential interference, one embodiment is to assign the same T1/T2 pattern for all the RNs within the same cell of the ENB 230, which is termed as synchronous RNs. For example, in one embodiment, all the RNs receive/transmit the signal from/to the ENB at substantially the same time (T2) while all the RNs receive/transmit the signal from/to the UEs during substantially the same time (T1), where T1 and T2 are different times.

Figure 4:
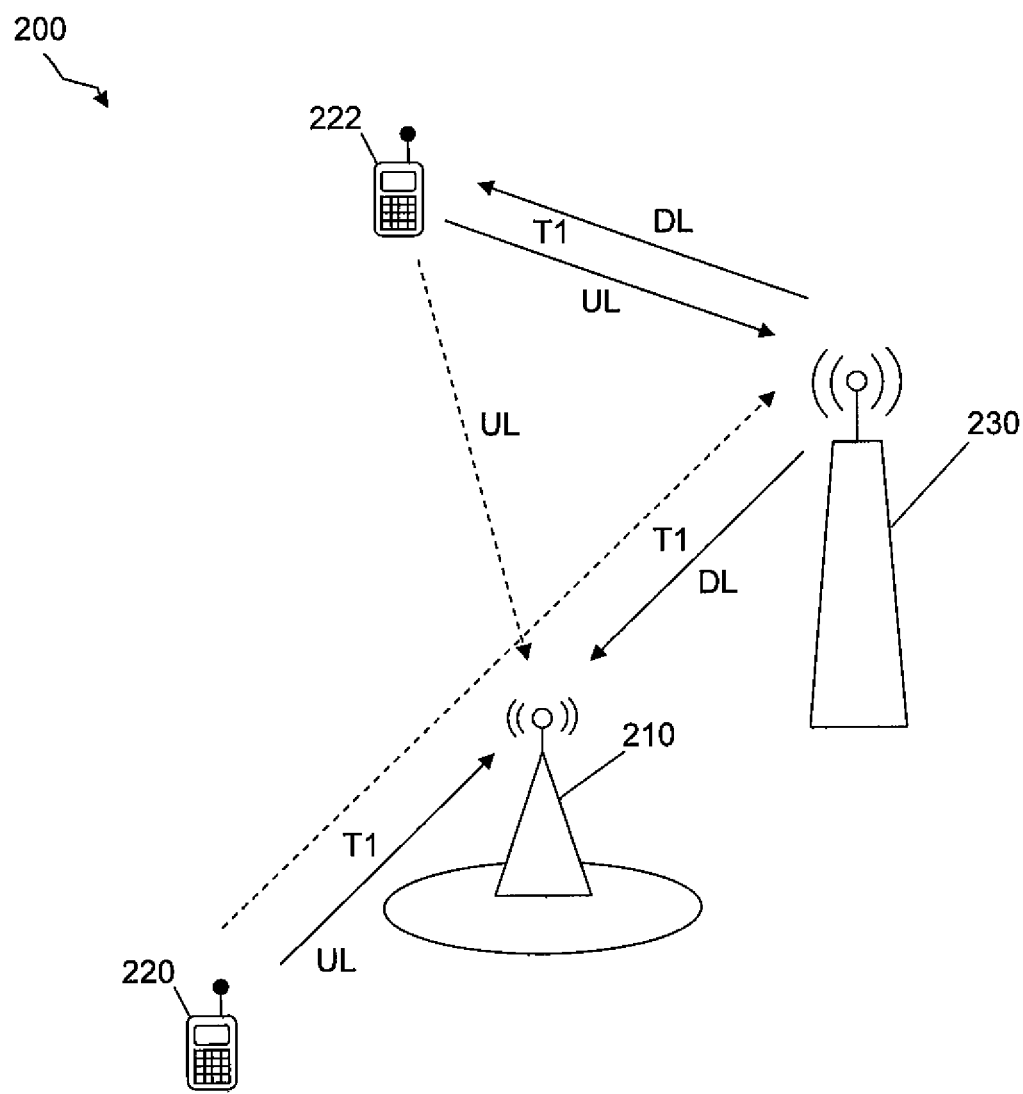
FIG. 4 is an illustration of a scenario for communication interference in an LTE-A system according to an embodiment of the disclosure.

FIG. 4 illustrates a scenario for signal interference between some of the components of the RAN 200. The RAN 200 may comprise a UE 222, which may communicate directly with the ENB 230 via a direct link. For instance, the UE 222 may be located outside the donor cell including the RN 210 or other RNs in the RAN 200. Therefore, the UE 222 may not use an access link with the RN 210. Further, the UE 222 may be in communication with the ENB 230 using the direct link between UE 222 and ENB 230 at about the same time, T1, when the RN 210 receives the signals from the UE 220 and the ENB 230.

Specifically, the UE 222 and the ENB 230 may establish downlink communications, from the ENB 230 to the UE 222, and uplink communications from the UE 222 to the ENB 230, at about T1. Also at about T1 of the half-duplex TD mode, the RN 210 may establish downlink communications with the ENB 230 and uplink communications with the UE 220. Consequently, the RN 210 may receive, at about the same time, signals corresponding to the uplink communications from UE 222 and signals corresponding to the uplink communications from the UE 220. Additionally, the signals may be assigned the same RBs or may be transmitted at about the same frequency. Hence, the uplink signals from UE 220 and UE 222 may interfere at the RN 210, which may affect transmission quality or introduce communication errors. Similarly, the ENB 230 may receive, at about the same time, signals corresponding to the uplink communications from UE 222 and signals corresponding to the uplink communications from the UE 220, which may also cause signal interference.

In the scenario of FIG. 4, all downlink communications may be scheduled at the ENB 230 at about T1. The downlink communications may comprise downlink communications between the ENB 230 and the UE 222 via the direct link, downlink communications between the ENB 230 and the RN 210 via the relay link (ENB assigns different RBs for these two links), but may not comprise downlink communications between the RN 210 and the UE 220 via the access link. Hence, there is no substantial interference for downlink communications between the signals received at the UE 220, other UEs that may be located within the same cell, or the UE 222.

Figure 5:
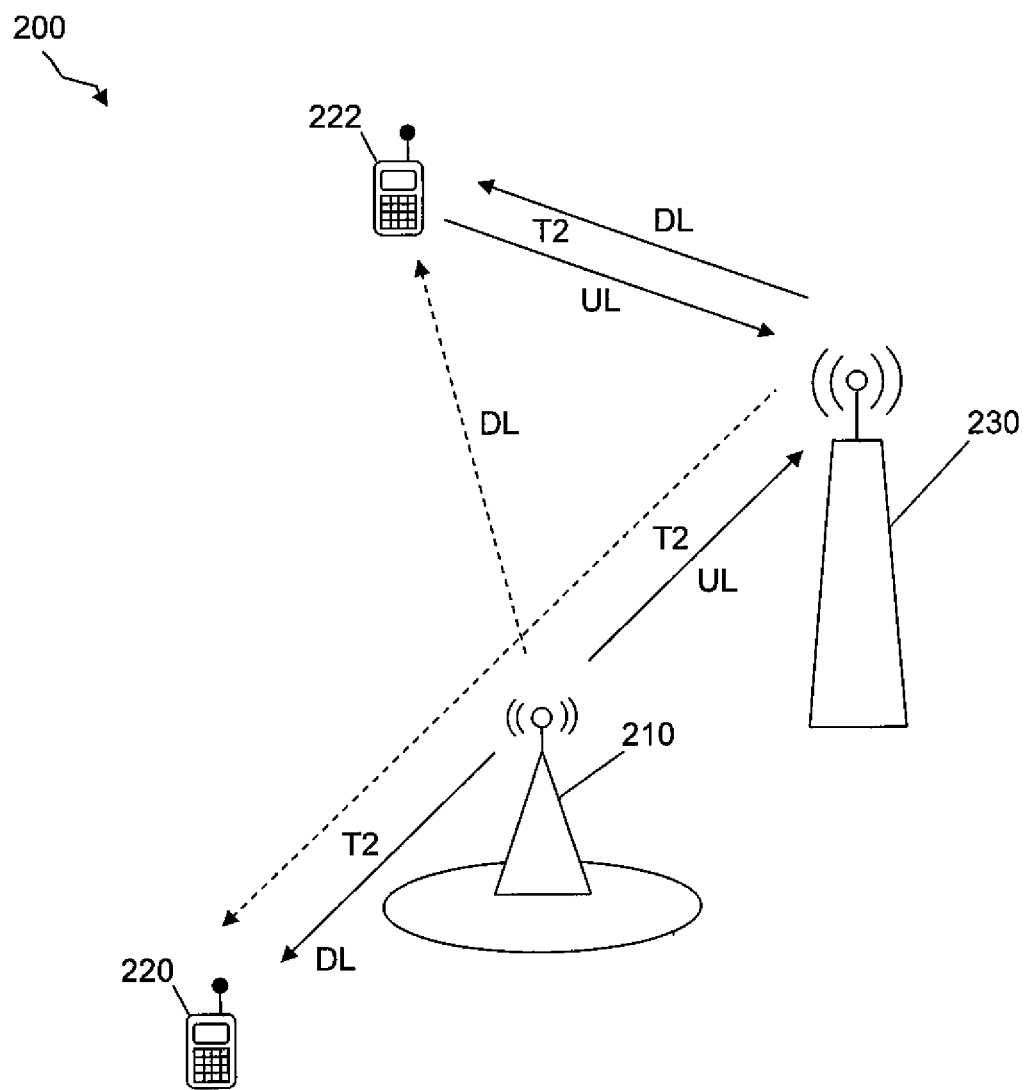
FIG. 5 is an illustration of another scenario for communication interference in an LTE-A system according to an embodiment of the disclosure.

FIG. 5 illustrates another scenario for signal interference between some of the components of the RAN 200. For instance, the UE 222 may be in communication with the ENB 230 at about the same time, T2, when the RN 210 transmits the signals to the UE 220 and the ENB 230. As such, the UE 222 and the ENB 230 may establish downlink communications and uplink communications at about T2. Also at about T2 of the half-duplex TD mode, the RN 210 may establish downlink communications with the UE 220 and uplink communications with the ENB 230. Consequently, the UE 222 may receive, at about the same time, signals corresponding to the downlink communications from RN 210 and signals corresponding to the downlink communications from the ENB 230. Hence, the uplink signals from RN 210 and ENB 230 may interfere at the UE 222, when the signals are transmitted at about the same frequency. Similarly, the UE 220 may receive, at about the same time, signals corresponding to the downlink communications from RN 210 and the ENB 230, which may cause signal interference at the UE 220.

In the scenario of FIG. 5, all uplink communications may be scheduled at the ENB 230 at about T2. The uplink communications may comprise uplink communications between the ENB 230 and the UE 222 via the direct link, uplink communications between the ENB 230 and the RN 210 via the relay link (ENB assigns different RBs for these two links), but may not comprise uplink communications between the RN 210 and the UE 220 via the access links. Hence, there is no substantial interference for uplink communications between the signals received at the RN 210 from the UE 220, other UEs that may be located within the same cell, and the UE 222.

Figure 6:
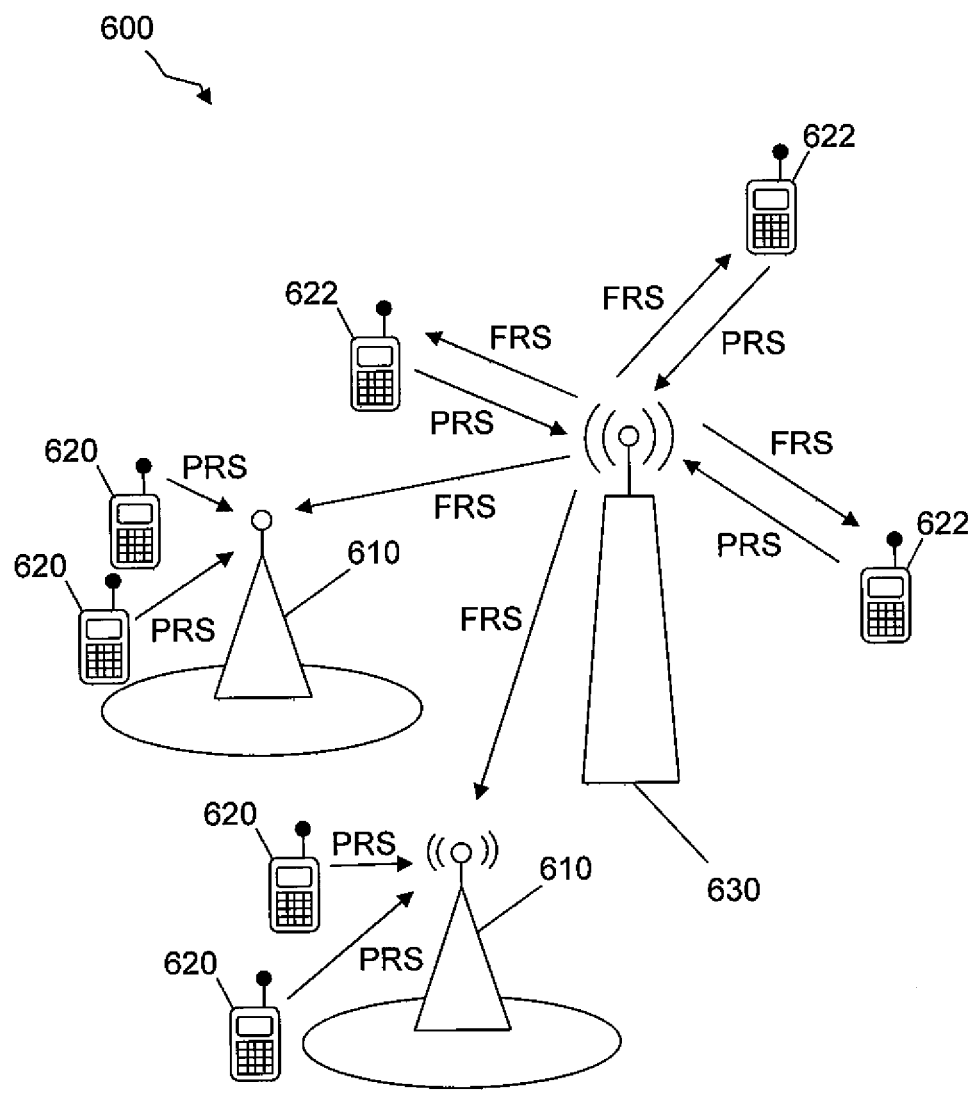
FIG. 6 is an illustration of a communication mode for preventing signal interference at a first time interval according to an embodiment of the disclosure.

FIG. 6 illustrates an embodiment of a communication mode for reducing signal interference in a RAN 600. Specifically, The RAN 600 may comprise a plurality of RNs 610, a plurality of UEs 620 within the same cells of the RNs 610, a plurality of UEs 622 outside the donor cells of the RNs 610, and at least one ENB 630. The UEs 622 may establish uplink and downlink communications directly with the ENB 630, for instance using direct links. The UEs 620 may communicate indirectly with the ENB 630 using access links with the RNs 610 within the same cells and relay links between the RNs 610 and the ENB 630.

The RNs 610 may use the half-duplex TD mode to establish the communications with the UEs 620 and the ENB 630. Hence, there may be no substantial interference for downlink communications at about T1 and for uplink communications at about T2 within the same cell, as described above. Further, in T1, the ENB 630 may centrally allocate or relocate the RBs to the RNs for uplink communications between all the RNs 610 and the UEs 620 within the same cells, such as frequency resources. In T2, the ENB 630 may centrally allocate or relocate the RBs to the RNs for downlink communications between all the RNs 610 and the UEs 620 within the same cells, such as frequency resources. For instance, the ENB 630 may allocate different RBs for the individual RNs 610 to reduce signal interference. In some embodiments, the ENB 630 may allocate the same RBs for different RNs 610, which may be located far away from each other, and therefore may suffer or introduce no substantial signal interference. Further, the ENB 630 may reserve some RBs for some network services, such as Voice over IP (VoIP) or other real-time services, which may not be allocated to the RNs 610.

The RNs 610 may independently schedule transmissions and receptions with the UEs 620 within the same cells using the allocated RBs by the ENB 630. For instance, the RNs 610 may assign the alternating TTIs of the half-duplex TD mode for all the UEs 620 within the same cell and may assign for each UE 620 a different allocated frequency of band. The allocated RBs to the RNs by the ENB may be fixed or may be semi-static, where the allocated frequencies may be changed by the ENB 630 based on loading or channel conditions.

Specifically, FIG. 6 illustrates the downlink and uplink communications between the different components of the RAN 600 at about T1. The ENB 630 may schedule all the downlink communications via the direct links with the UEs 622 and via the relay links with the RNs 610, which is referred to as FRS. However, the ENB 630 may schedule the uplink communications via the direct links with the UEs 622, while the RNs 610 may schedule the uplink communications via the access links with the UEs 620 within the same cells, which is referred to as PRS. According to PRS, the ENB 630 may also allocate the RBs to the RNs for the uplink communications with the UEs 622 and the RNs 610. In turn, the RNs 610 may assign the allocated RBs to the UEs 620 within the same cells. As such, the UEs 620 may be allocated different RBs or different frequencies than the remaining UEs 620 or UEs 622. In some embodiments, the RBs allocated to the RNs may be reused in different RNs depending on the location of the RNs 610.

Figure 7:
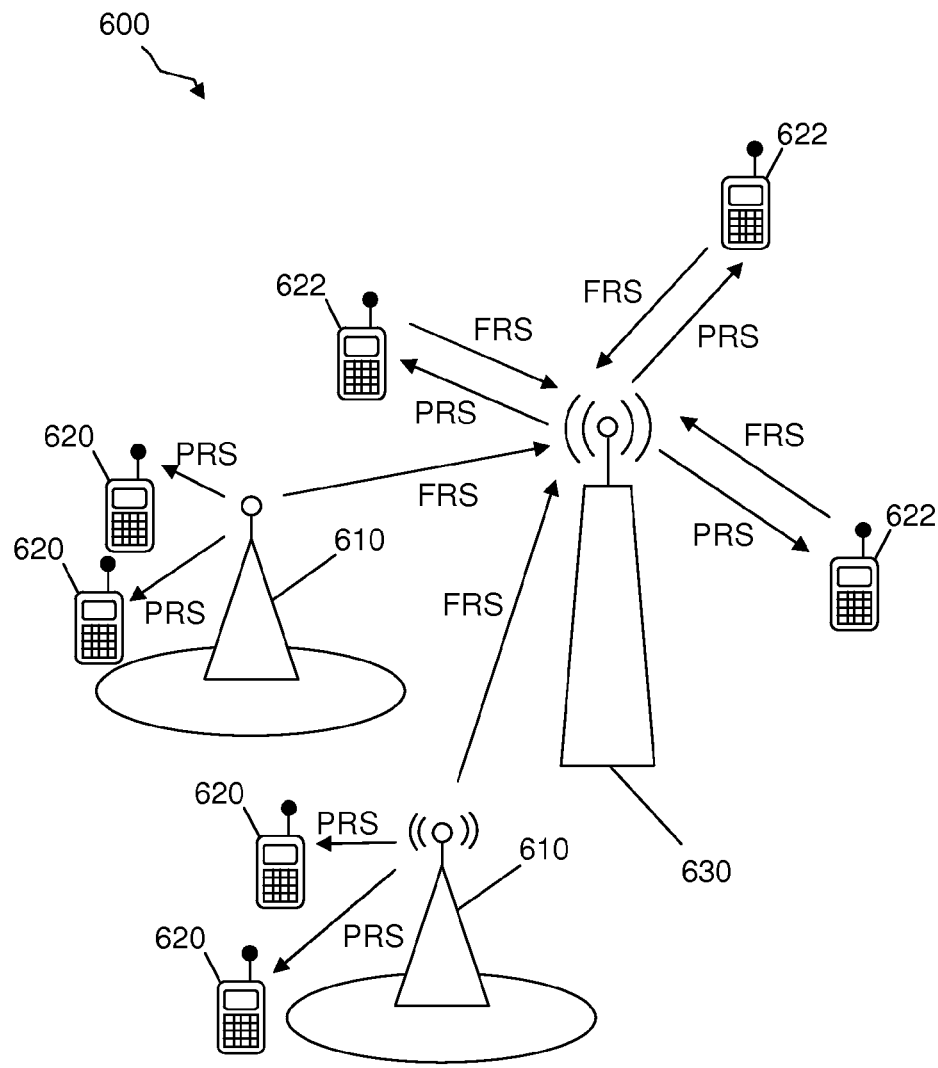
FIG. 7 is an illustration of a communication mode for preventing signal interference at a second time interval according to another embodiment of the disclosure.

FIG. 7 illustrates another embodiment of a communication mode for preventing signal interference in the RAN 600. Specifically, FIG. 7 illustrates the downlink and uplink communications between the different components of the RAN 600 at about T2. The ENB 630 may use FRS to schedule all the uplink communications via the direct links with the UEs 622 and via the relay links with the RNs 610. Additionally, the ENB 630 may use PRS to schedule the downlink communications via the direct links with the UEs 622, while the RNs 610 may schedule the downlink communications via the access links with the UEs 620 within the same cells. Accordingly, the ENB 630 may allocate the RBs to the RNs for the downlink communications with the UEs 622 and the RNs 610, which may assign the allocated RBs to the UEs 620 within the same cells.

Figure 8:
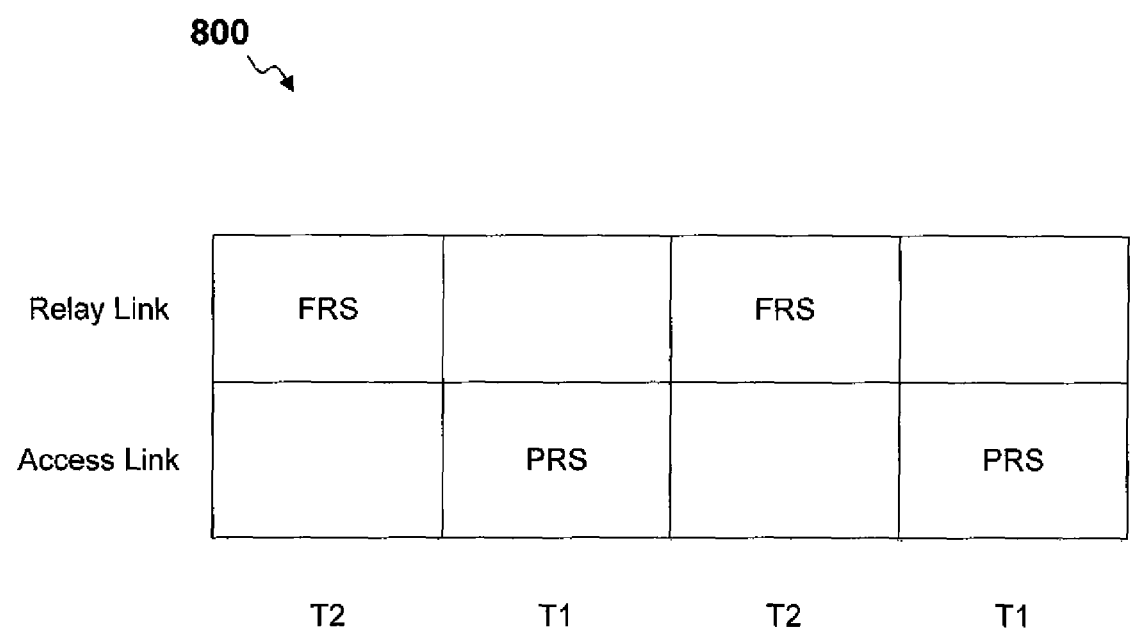
FIG. 8 is an illustration of resource block scheduling for a communication mode for preventing signal interference according to an embodiment of the disclosure.

FIG. 8 illustrates a resource block scheduling 800 for reducing communication interference using a full-duplex TD mode and FDD, for instance in the RAN 300. Using full-duplex TD mode, the RN 310 may communicate with the UE 320 within the same cell via an access link at about T1, and with the ENB 330 via a relay link at about T2. When a UE 322 located outside the cell of the RNs communicates with the ENB 330 via a direct link at about T1, the UE 322 or the RN 310 may suffer at least some signal interference in both the uplink and downlink communications. However, when the UE 322 communicates with the ENB 330 at about T2, no uplink or downlink communications take place via the access link between the RN 310 and the UE 320. Similarly, the RN 310 may communicate with the ENB 330 via the relay link at about T2. Accordingly, the ENB 330 may use FRS during T2 and PRS during T1, as described above, to schedule the FDD communications and allocate RBs for the UE 322 and the RN 310 to reduce substantial interference. Further, as shown in FIG. 8, the FRS may be used for communications via the relay link in addition to the access link at about T2, while the PRS may be used for communications via the access link at about T1.

Figure 9:
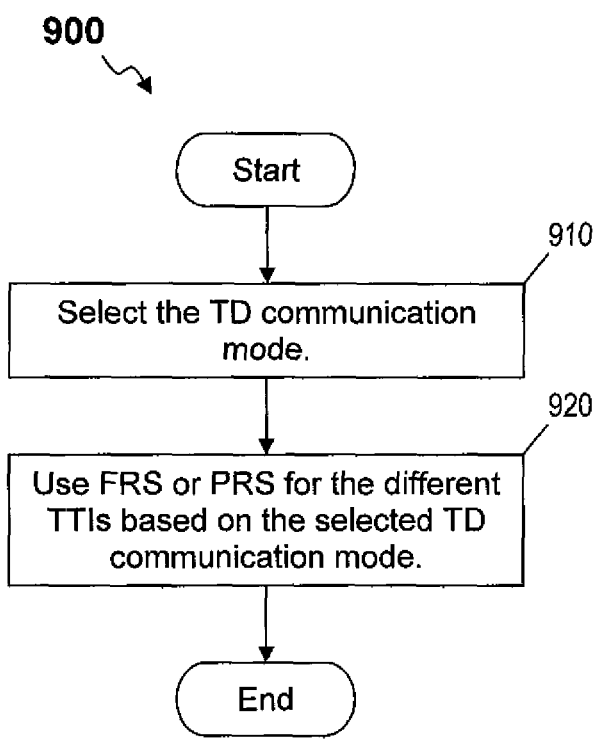
FIG. 9 is a flow chart of a method for preventing signal interference according to an embodiment of the disclosure.

FIG. 9 illustrates a method 900 for reducing communication interference in a RAN including an RN. At block 910, the method 900 may select the TD communication mode to establish communications, such as FDD communications, between the RN, at least one UE within the same cell, and an ENB or similar access device. In some embodiments, a plurality of RNs may use the same or different TD communication modes. For instance, the TD communication mode may be a half-duplex mode of a full-duplex mode comprising at least two alternating TTIs, which may or may not be equal. At block 920, the method 900 may use FRS or PRS for the different TTIs based on the selected TD communication mode. For instance, if a half-duplex mode is selected, the method 900 may use FRS for all downlink communications and PRS for uplink communications at about T1, and may use FRS for all uplink communications and PRS for downlink communications at about T2. Alternatively, if a full-duplex mode is selected, the method 900 may use FRS for relay link communications at about T2, and PRS for access link communications at about T1.

Figure 10:
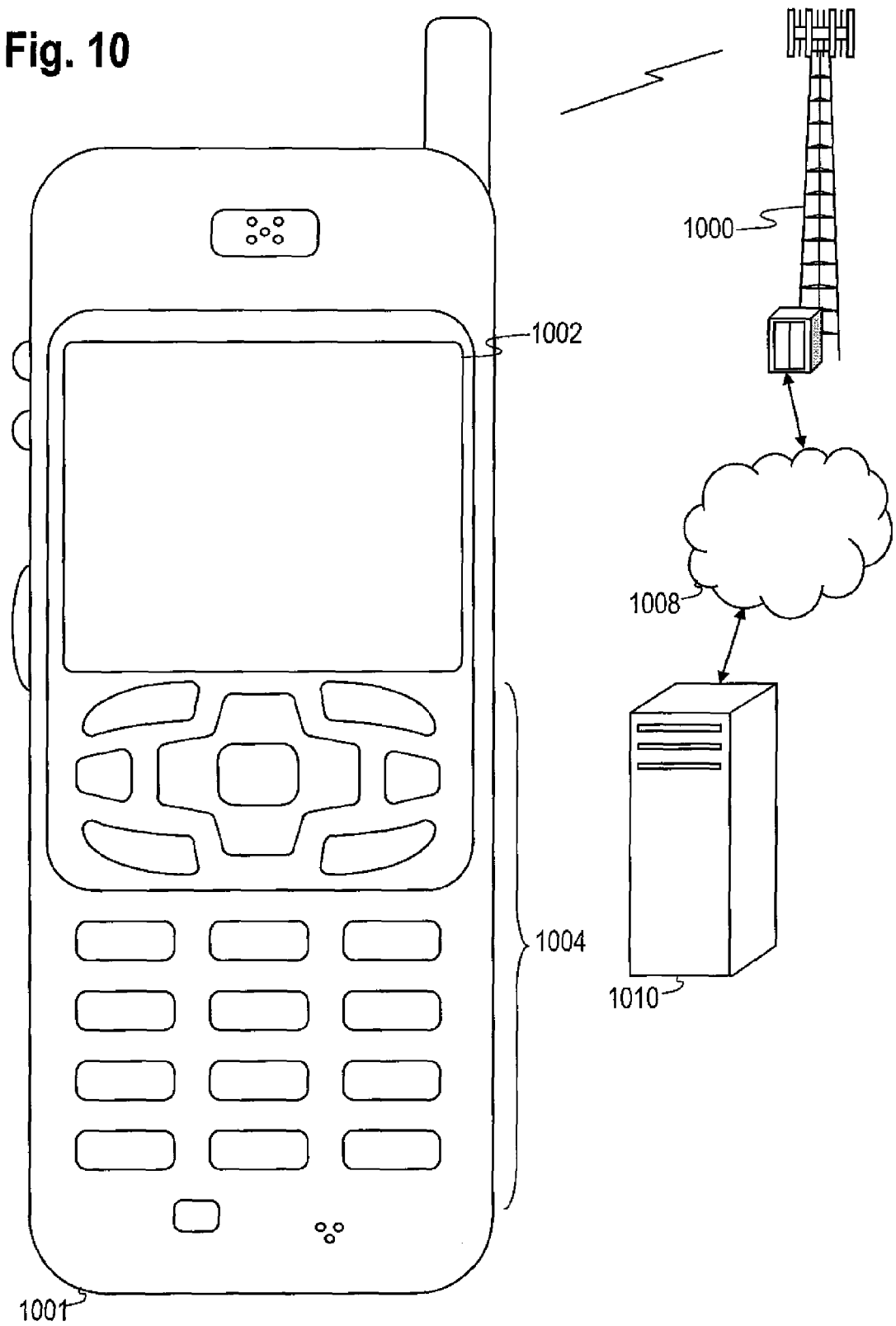
FIG. 10 is a diagram of a wireless communications system including a user agent operable for some of the various embodiments of the disclosure.

FIG. 10 illustrates a wireless communications system including an embodiment of the UE 1001. The UE 1001 is operable for implementing aspects of the disclosure, but the disclosure should not be limited to these implementations. Though illustrated as a mobile phone, the UE 1001 may take various forms including a wireless handset, a pager, a personal digital assistant (PDA), a portable computer, a tablet computer, or a laptop computer. Many suitable devices combine some or all of these functions. In some embodiments of the disclosure, the UE 1001 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 1001 may be a portable, laptop or other computing device. The UE 1001 may support specialized activities such as gaming, inventory control, job control, and/or task management functions, and so on.

The UE 1001 includes a display 1002. The UE 1001 also includes a touch-sensitive surface, a keyboard or other input keys generally referred as 1004 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 1001 may present options for the user to select, controls for the user to actuate, and/or cursors or other indicators for the user to direct.

The UE 1001 may further accept data entry from the user, including numbers to dial or various parameter values for configuring the operation of the UE 1001. The UE 1001 may further execute one or more software or firmware applications in response to user commands. These applications may configure the UE 1001 to perform various customized functions in response to user interaction. Additionally, the UE 1001 may be programmed and/or configured over-the-air, for example from a wireless base station, a wireless access point, or a peer UE 1001.

Among the various applications executable by the UE 1001 are a web browser, which enables the display 1002 to show a web page. The web page may be obtained via wireless communications with a wireless network access node, a cell tower, a peer UE 1001, or any other wireless communication network or system 1000. The network 1000 is coupled to a wired network 1008, such as the Internet. Via the wireless link and the wired network, the UE 1001 has access to information on various servers, such as a server 1010. The server 1010 may provide content that may be shown on the display 1002. Alternately, the UE 1001 may access the network 1000 through a peer UE 1001 acting as an intermediary, in a relay type or hop type of connection.

Figure 11:
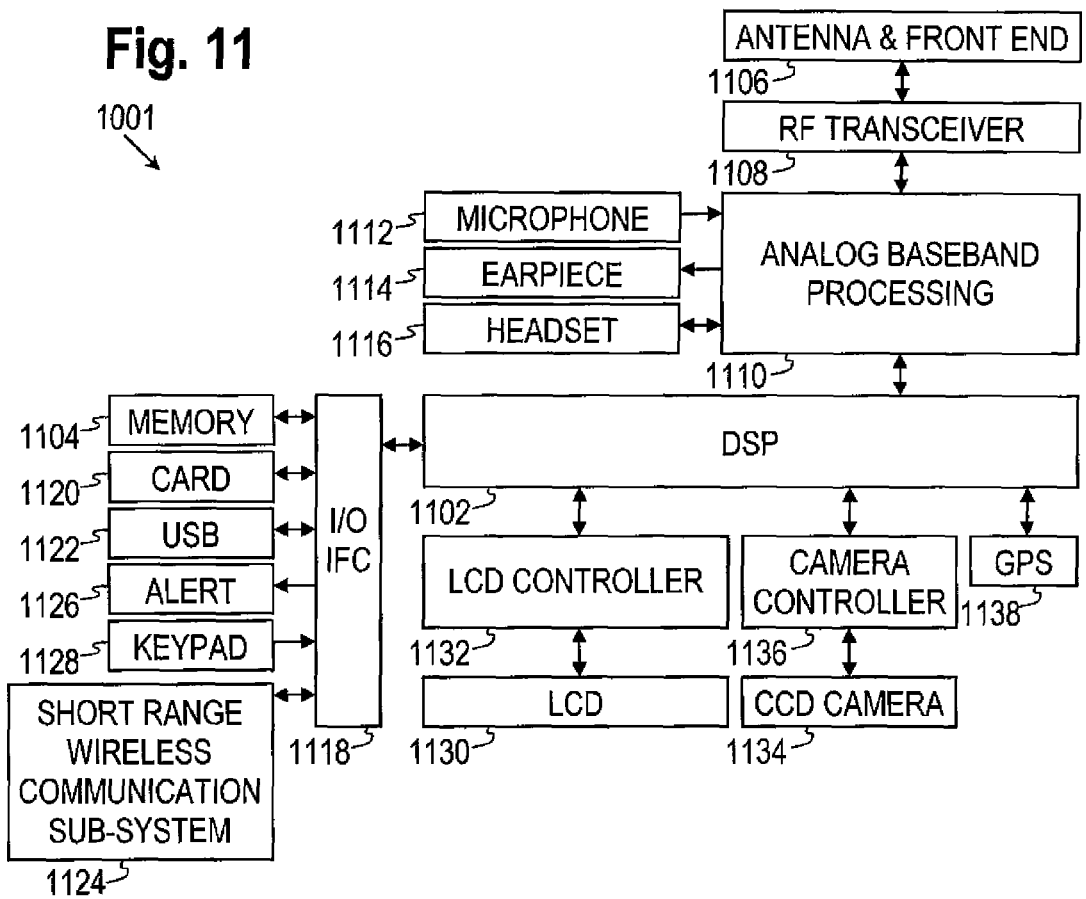
FIG. 11 is a block diagram of a user agent operable for some of the various embodiments of the disclosure.

FIG. 11 shows a block diagram of the UE 1001. While a variety of known components of UEs 1001 are depicted, in an embodiment a subset of the listed components and/or additional components not listed may be included in the UE 1001. The UE 1001 includes a digital signal processor (DSP) 1102 and a memory 1104. As shown, the UE 1001 may further include an antenna and front end unit 1106, a radio frequency (RF) transceiver 1108, an analog baseband processing unit 1110, a microphone 1112, an earpiece speaker 1114, a headset port 1116, an input/output interface 1118, a removable memory card 1120, a universal serial bus (USB) port 1122, a short range wireless communication sub-system 1124, an alert 1126, a keypad 1128, a liquid crystal display (LCD), which may include a touch sensitive surface 1130, an LCD controller 1132, a charge-coupled device (CCD) camera 1134, a camera controller 1136, and a global positioning system (GPS) sensor 1138. In an embodiment, the UE 1001 may include another kind of display that does not provide a touch sensitive screen. In an embodiment, the DSP 1102 may communicate directly with the memory 1104 without passing through the input/output interface 1118.

The DSP 1102 or some other form of controller or central processing unit operates to control the various components of the UE 1001 in accordance with embedded software or firmware stored in memory 1104 or stored in memory contained within the DSP 1102 itself. In addition to the embedded software or firmware, the DSP 1102 may execute other applications stored in the memory 1104 or made available via information carrier media such as portable data storage media like the removable memory card 1120 or via wired or wireless network communications. The application software may comprise a compiled set of machine-readable instructions that configure the DSP 1102 to provide the desired functionality, or the application software may be high-level software instructions to be processed by an interpreter or compiler to indirectly configure the DSP 1102.

The antenna and front end unit 1106 may be provided to convert between wireless signals and electrical signals, enabling the UE 1001 to send and receive information from a cellular network or some other available wireless communications network or from a peer UE 1001. In an embodiment, the antenna and front end unit 1106 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1106 may include antenna tuning and/or impedance matching components, RF power amplifiers, and/or low noise amplifiers.

The RF transceiver 1108 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1110 and/or the DSP 1102 or other central processing unit. In some embodiments, the RF Transceiver 1108, portions of the antenna and front end 1106, and the analog baseband processing unit 1110 may be combined in one or more processing units and/or application specific integrated circuits (ASICs).

The analog baseband processing unit 1110 may provide various analog processing of inputs and outputs, for example analog processing of inputs from the microphone 1112 and the headset 1116 and outputs to the earpiece 1114 and the headset 1116. To that end, the analog baseband processing unit 1110 may have ports for connecting to the built-in microphone 1112 and the earpiece speaker 1114 that enable the UE 1001 to be used as a cell phone. The analog baseband processing unit 1110 may further include a port for connecting to a headset or other hands-free microphone and speaker configuration. The analog baseband processing unit 1110 may provide digital-to-analog conversion in one signal direction and analog-to-digital conversion in the opposing signal direction. In some embodiments, at least some of the functionality of the analog baseband processing unit 1110 may be provided by digital processing components, for example by the DSP 1102 or by other central processing units.

The DSP 1102 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1102 may perform modulation, coding, interleaving, and spreading, and for a receiver function the DSP 1102 may perform despreading, deinterleaving, decoding, and demodulation. In another embodiment, for example in an orthogonal frequency division multiplex access (OFDMA) technology application, for the transmitter function the DSP 1102 may perform modulation, coding, interleaving, inverse fast Fourier transforming, and cyclic prefix appending, and for a receiver function the DSP 1102 may perform cyclic prefix removal, fast Fourier transforming, deinterleaving, decoding, and demodulation. In other wireless technology applications, yet other signal processing functions and combinations of signal processing functions may be performed by the DSP 1102.

The DSP 1102 may communicate with a wireless network via the analog baseband processing unit 1110. In some embodiments, the communication may provide Internet connectivity, enabling a user to gain access to content on the Internet and to send and receive email or text messages. The input/output interface 1118 interconnects the DSP 1102 and various memories and interfaces. The memory 1104 and the removable memory card 1120 may provide software and data to configure the operation of the DSP 1102. Among the interfaces may be the USB interface 1122 and the short range wireless communication sub-system 1124. The USB interface 1122 may be used to charge the UE 1001 and may also enable the UE 1001 to function as a peripheral device to exchange information with a personal computer or other computer system. The short range wireless communication sub-system 1124 may include an infrared port, a Bluetooth interface, an IEEE 802.11 compliant wireless interface, or any other short range wireless communication sub-system, which may enable the UE 1001 to communicate wirelessly with other nearby mobile devices and/or wireless base stations.

The input/output interface 1118 may further connect the DSP 1102 to the alert 1126 that, when triggered, causes the UE 1001 to provide a notice to the user, for example, by ringing, playing a melody, or vibrating. The alert 1126 may serve as a mechanism for alerting the user to any of various events such as an incoming call, a new text message, and an appointment reminder by silently vibrating, or by playing a specific pre-assigned melody for a particular caller.

The keypad 1128 couples to the DSP 1102 via the interface 1118 to provide one mechanism for the user to make selections, enter information, and otherwise provide input to the UE 1001. The keyboard 1128 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 1130, which may include touch screen capability and also display text and/or graphics to the user. The LCD controller 1132 couples the DSP 1102 to the LCD 1130.

The CCD camera 1134, if equipped, enables the UE 1001 to take digital pictures. The DSP 1102 communicates with the CCD camera 1134 via the camera controller 1136. In another embodiment, a camera operating according to a technology other than Charge Coupled Device cameras may be employed. The GPS sensor 1138 is coupled to the DSP 1102 to decode global positioning system signals, thereby enabling the UE 1001 to determine its position. Various other peripherals may also be included to provide additional functions, e.g., radio and television reception.

Figure 12:
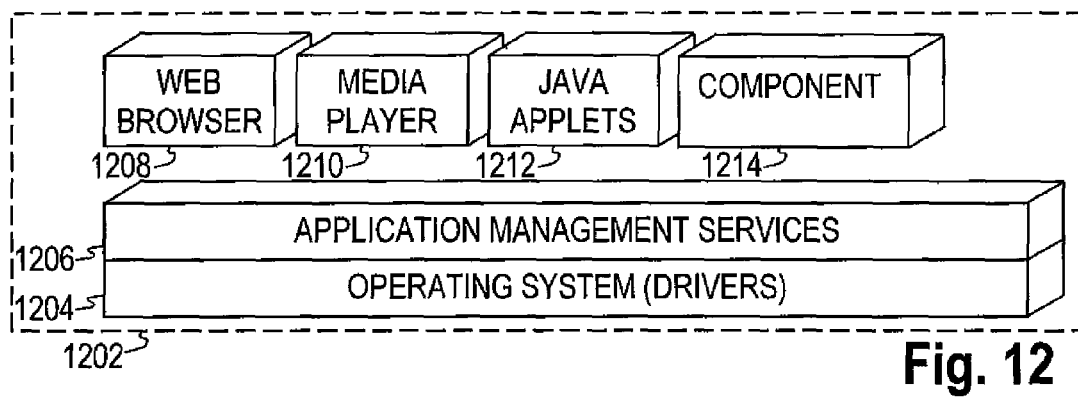
FIG. 12 is a diagram of a software environment that may be implemented on a user equipment operable for some of the various embodiments of the disclosure.

FIG. 12 illustrates a software environment 1202 that may be implemented by the DSP 1102. The DSP 1102 executes operating system drivers 1204 that provide a platform from which the rest of the software operates. The operating system drivers 1204 provide drivers for the UE hardware with standardized interfaces that are accessible to application software. The operating system drivers 1204 include application management services ("AMS") 1206 that transfer control between applications running on the UE 1001. Also shown in FIG. 12 are a web browser application 1208, a media player application 1210, and Java applets 1212. The web browser application 1208 configures the UE 1001 to operate as a web browser, allowing a user to enter information into forms and select links to retrieve and view web pages. The media player application 1210 configures the UE 1001 to retrieve and play audio or audiovisual media. The Java applets 1212 configure the UE 1001 to provide games, utilities, and other functionality. A component 1214 might provide functionality described herein. Although shown at an application layer, the component 1214 might be provided at various layers within the environment 1202 or elsewhere on the UE 1001.

Figure 13:
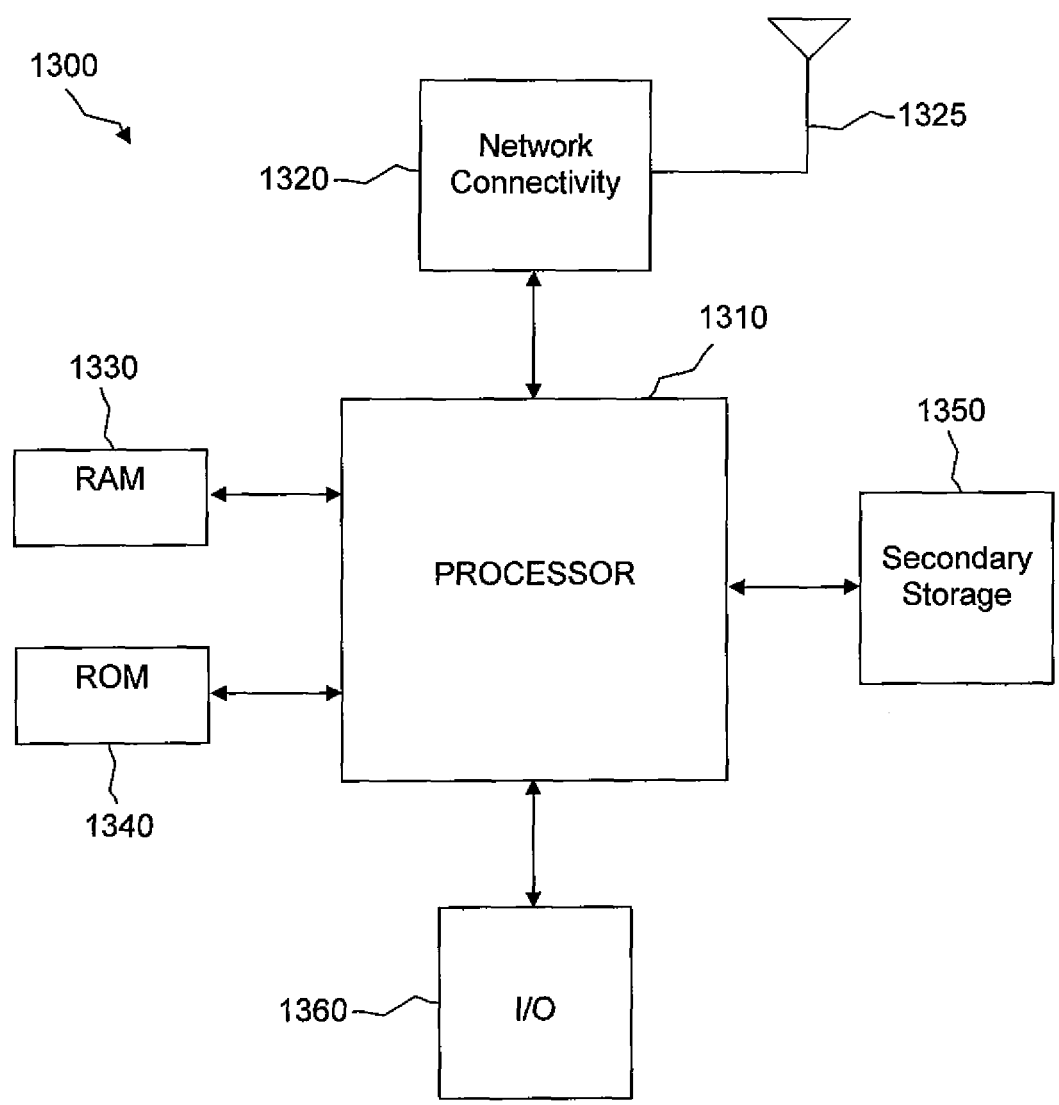
FIG. 13 illustrates an exemplary general-purpose computer system suitable for implementing the several embodiments of the present disclosure.

The UE 1001 and other components described above might include a processing component that is capable of executing instructions related to the actions described above. FIG. 13 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UE 1001, such as the display 1002 and the input 1004.

The following 3rd Generation Partnership Project (3GPP) Technical Specifications (TS) are incorporated herein by reference: TS23.401, TS23.203, and TS36.300 are incorporated herein by reference for all purposes.

In an embodiment, a network is provided comprising a relay node (RN), wherein the RN is configured to assign a plurality of resource blocks (RBs) allocated by an enhanced node B (ENB) for at least one user equipment (UE) within the same cell as the RN.

In an alternative embodiment, a network is provided comprising an enhanced node B (ENB), wherein the ENB is configured to allocate a plurality of resource blocks (RBs) for a relay node (RN), wherein the RBs are assigned for at least one user equipment (UE) within the same cell as the RN.

In another embodiment, a method is provided for communicating in a network, comprising selecting a time-division (TD) communication mode, and using resource scheduling based on the selected TD communication mode.

In another embodiment, a method is provided that comprises exchanging signals between at least one relay node (RN) and at least one first user equipment (UE), between the RN and an enhanced node B (ENB), and between the ENB and at least one second UE at different times, using different frequencies, or both to reduce substantial interference between the signals.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicated through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network comprising:
a relay node (RN),
wherein the RN is configured to assign a plurality of resource blocks (RBs) allocated by an enhanced node B (ENB) for at least one user equipment (UE),
wherein the RN is configured to communicate in a half-duplex mode, wherein a full resource scheduling (FRS) is used for downlink communications and a partial resource scheduling (PRS) is used for uplink communications at a first transmission time interval (TTI), and wherein an FRS is used for uplink communications and a PRS is used for downlink communications at a second TTI.

2. The network of claim 1, wherein the RN communicates with the UE and ENB using one of time-division and frequency-division duplexing.

3. The network of claim 2, wherein the RN receives signals from the UE and the ENB at the first TTI and transmits signals to the UE and the ENB at the second TTI, and wherein the first TTI and the second TTI are alternating TTIs.

4. The network of claim 3, further comprising:
a plurality of RNs in communication with the ENB, each of the RNs communicating with one or more separate UEs, wherein the plurality of RNs receive signals from the UE and ENB at the first TTI and wherein the plurality of RNs transmit signals to the UEs and ENB at the second TTI.

5. The network of claim 3, wherein the RN comprises two transmitters and two receivers or comprises two transceivers.

6. The network of claim 1, further comprising:
a plurality of RNs in communication with the ENB, each of the RNs communicating with one or more separate UEs, wherein the plurality of RNs and respective UEs communicate (transmit/receive signals) with one another at the first TTI and wherein the plurality of RNs and ENB communicate (transmit/receive signals) with one another at the second TTI.

7. The network of claim 1, wherein the RN comprises one transmitter and one receiver or comprises one transceiver.

8. The network of claim 2, wherein a "guard" time between a plurality of transmission time interval (TTIs) may be used to prevent substantial overlap between transmitted and received signals.

9. A network comprising:
an enhanced node B (ENB),
wherein the ENB is configured to allocate a plurality of resource blocks (RBs) for a relay node (RN), wherein the RBs are assigned for at least one user equipment (UE),
wherein the ENB is configured to communicate in a half-duplex mode, wherein a full resource scheduling (FRS) is used for downlink communications and a partial resource scheduling (PRS) is used for uplink communications at a first transmission time interval (TTI), and wherein an FRS is used for uplink communications and a PRS is used for downlink communications at a second TTI.

10. The network of claim 9, wherein the RN communicates with the UE and ENB using one of time-division and frequency-division duplexing.

11. The network of claim 10, wherein the RN receives signals from the UE and the ENB at the first TTI and transmits signals to the UE and the ENB at the second TTI, wherein the first TTI and the second TTI are alternating TTIs.

12. The network of claim 11, further comprising:
a plurality of RNs in communication with the ENB, each of the RNs communicating with one or more separate UEs, wherein the plurality of RNs receive signals from the UE and ENB at the first TTI and wherein the plurality of RNs transmit signals to the UEs and ENB at the second TTI.

13. The network of claim 11, wherein the RN comprises two transmitters and two receivers or comprises two transceivers.

14. The network of claim 9, further comprising:
a plurality of RNs in communication with the ENB, each of the RNs communicating with one or more separate UEs, wherein the plurality of RNs and respective UEs communicate (transmit/receive signals) with one another at the first TTI and wherein the plurality of RNs and ENB communicate (transmit/receive signals) with one another at the second TTI.

15. The network of claim 9, wherein the RN comprises one transmitter and one receiver or comprises one transceiver.

16. The network of claim 10, wherein a "guard" time between a plurality of transmission time interval (TTIs) may be used to prevent substantial overlap between transmitted and received signals.

17. A method for communicating in a network, comprising:
selecting a time-division (TD) communication mode; and
using resource scheduling based on the selected TD communication mode, wherein the TD communication mode is a half-duplex mode, wherein a full resource scheduling (FRS) is used for downlink communications and a partial resource scheduling (PRS) is used for uplink communications at a first transmission time interval (TTI), and wherein an FRS is used for uplink communications and a PRS is used for downlink communications at a second TTI.

18. The method of claim 17, wherein the downlink communications are established at the first TTI between at least one relay node (RN) and at least a first user equipment (UE) in direct communication with an enhanced node B (ENB), and wherein the uplink communications are established between the UE and the ENB and between the RN and at least a second UE within the same cell as the RN.

19. The method of claim 17, wherein the uplink communications at the second TTI are established between at least one relay node (RN) and at least a first user equipment (UE) in direct communication with an enhanced node B (ENB), and wherein the downlink communications are established between the UE and the ENB and between the RN and at least a second UE within the same cell as the RN.

20. The method of claim 17, wherein a plurality of resource blocks (RBs) are allocated for at least one relay node (RN) and at least a first user equipment (UE) in direct communication with an enhanced node B (ENB); and wherein at least some of the resource blocks allocated to the RN are assigned to at least a second UE within the same cell as the RN.

21. The method of claim 20, wherein at least some of the RBs are reserved for Voice over IP (VoIP) services or other real-time services, and wherein the reserved RBs are not allocated to the RN, the first UE, or the second UE.

22. A method comprising:
exchanging signals between at least one relay node (RN) and at least one first user equipment (UE), and further exchanging signals between the RN and an enhanced node B (ENB), and further exchanging signals between the ENB and at least one second UE to reduce substantial interference between the signals, wherein exchanging signals occurs in a half-duplex mode, wherein a full resource scheduling (FRS) is used for downlink communications and a partial resource scheduling (PRS) is used for uplink communications at a first transmission time interval (TTI), and wherein an FRS is used for uplink communications and a PRS is used for downlink communications at a second TTI.

23. A user equipment (UE), comprising:
a component configured to receive an assignment from a relay node (RN) of a plurality of resource blocks (RBs) allocated by an enhanced node B (ENB), wherein the component is configured to communicate in a half-duplex mode, wherein a full resource scheduling (FRS) is used for downlink communications and a partial resource scheduling (PRS) is used for uplink communications at a first transmission time interval (TTI), and wherein an FRS is used for uplink communications and a PRS is used for downlink communications at a second TTI.

24. The UE of claim 23, wherein the UE communicates with the RN using time-division (TD).

25. The UE of claim 24, wherein the UE transmits signals to the RN at the first TTI and receives signals from the RN at the second TTI, and wherein the first TTI and the second TTI are alternating TTIs.

* * * * *